United States Patent
Nomura

[11] Patent Number: 5,928,305
[45] Date of Patent: *Jul. 27, 1999

[54] MAP DATABASE APPARATUS

[75] Inventor: Takashi Nomura, Kanagawa, Japan

[73] Assignee: Xanavi Informatics Corporation, Kanagawa, Japan

[*] Notice: This patent is subject to a terminal disclaimer.

[21] Appl. No.: 08/634,853

[22] Filed: Apr. 19, 1996

[30] Foreign Application Priority Data

Apr. 21, 1995 [JP] Japan .................................. 7-097320

[51] Int. Cl.⁶ .................................................. G06F 165/00
[52] U.S. Cl. ........................ 701/207; 701/200; 701/208; 701/210; 701/211; 701/212; 340/990
[58] Field of Search .................................. 701/200, 201, 701/202, 206, 207, 208, 209, 210, 211, 212; 340/988, 990, 995; 73/178 R

[56] References Cited

U.S. PATENT DOCUMENTS

| 5,036,471 | 7/1991 | Tamura et al. | 701/209 |
| 5,161,886 | 11/1992 | De Jong et al. | 701/209 |
| 5,204,817 | 4/1993 | Yoshida | 701/209 |
| 5,337,245 | 8/1994 | Matsuzaki | 701/208 |
| 5,410,485 | 4/1995 | Ichikawa | 701/209 |
| 5,459,667 | 10/1995 | Odagaki et al. | 701/209 |
| 5,523,765 | 6/1996 | Ichikawa | 701/213 |

FOREIGN PATENT DOCUMENTS

| 1-263688 | 10/1989 | Japan . |
| 2-90191 | 3/1990 | Japan . |
| 2-267583 | 11/1990 | Japan . |
| 3-26917 | 2/1991 | Japan . |
| 3-225391 | 10/1991 | Japan . |
| 2 276 722 | 10/1994 | United Kingdom . |

OTHER PUBLICATIONS

Proceedings of the Vehicle Navigation and Information Systems Conference (VNIS), No. Conf. 1, Sep. 1989, Toronto, pp. 319–323, S. Kamijo et al., Digital Road Map Data Base for Vehicle Navigation and Road Information Systems.

Primary Examiner—William A. Cuchlinski, Jr.
Assistant Examiner—Gertrude Arthur
Attorney, Agent, or Firm—Evenson, McKeown, Edwards & Lenahan, P.L.L.C.

[57] ABSTRACT

A road on a map is expressed as link string data constituted with a plurality of links which represent minimum units of the road and nodes on a start point and an end point of the plurality of links. A map database apparatus is provided with a first storage device which stores in memory node information constituted with identifying information for identifying a plurality of links and position information of a node shared by adjacent links as map display data, and a second storage device which stores in memory home node information on an identical node, which is belonging to one link string data, with position information identical to that of a node of another link string data and adjacent node information which represents a node adjacent to the identical node in a link of another link string data to be connected to the identical node as route search information.

21 Claims, 26 Drawing Sheets

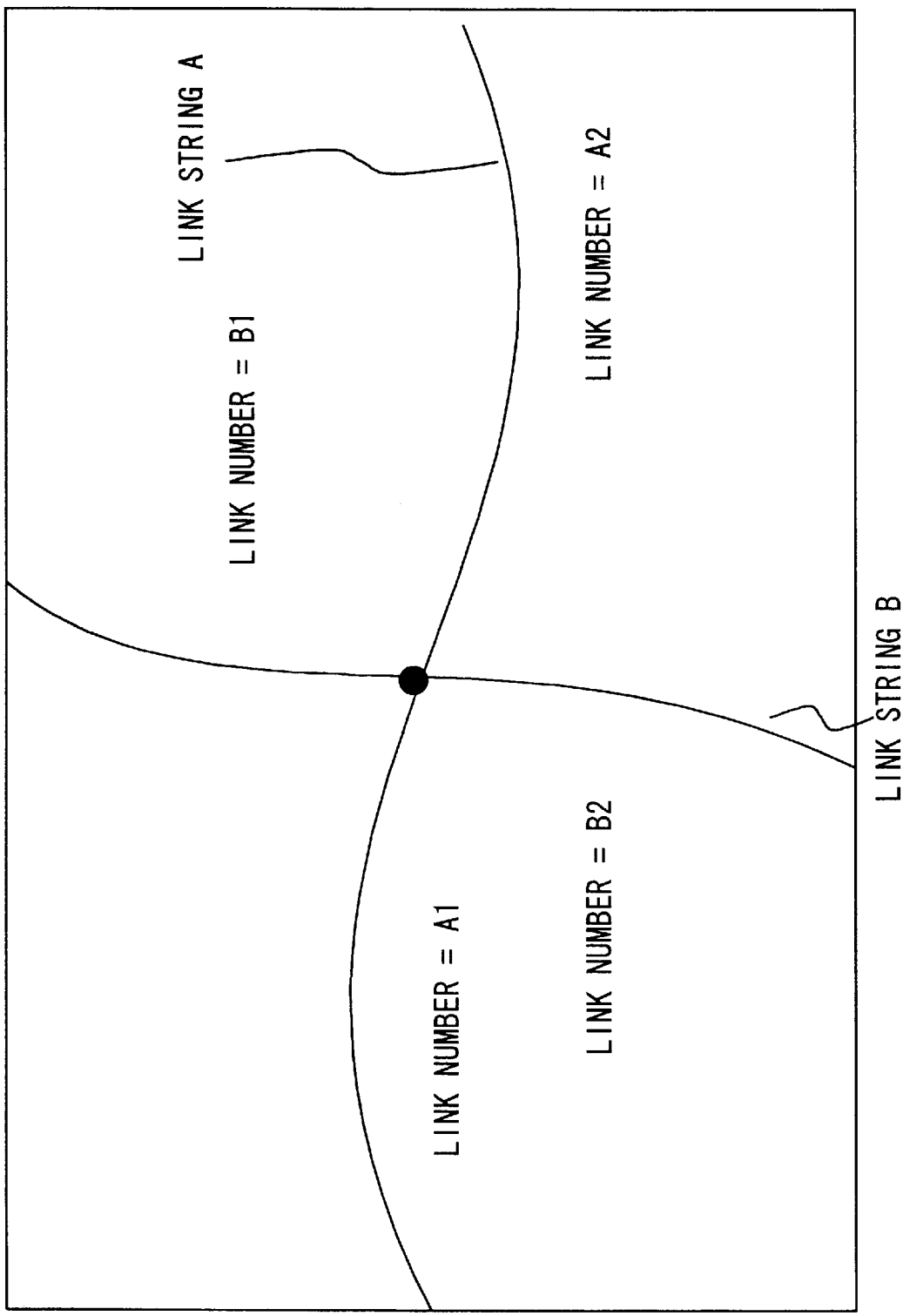

FIG. 12

| ATTRIBUTE | POSITIONAL COORDINATE | X1 | |
|---|---|---|---|
| | | Y1 | NODE N1 |
| LINK NO. A | | | |
| | | X2 | INTERPOLATION POINT |
| | | Y2 | |
| | | X3 | INTERPOLATION POINT |
| | | Y3 | |
| | | X4 | INTERPOLATION POINT |
| | | Y4 | |
| | | X5 | INTERPOLATION POINT |
| | | Y5 | |
| | | X6 | |
| | | Y6 | NODE N0 |
| LINK NO. C | | | |
| | | X7 | INTERPOLATION POINT |
| | | Y7 | |
| | | X8 | INTERPOLATION POINT |
| | | Y8 | |
| | | X9 | |
| | | Y9 | NODE N3 |
| LINK NO. E | | | |

FIG. 15B

| BIT | DETAILS | |
|---|---|---|
| 15 - 11 | ONE-WAY TRAFFIC | ① NO ONE-WAY ROAD |
| | | ② ONE-WAY TRAFFIC IN FORWARD DIRECTION *1 |
| | | ③ ONE-WAY TRAFFIC IN REVERSE DIRECTION *2 |
| | | ④ NO TRAFFIC IN BOTH DIRECTIONS *3 |
| | CLASSIFICATIONS OF WIDTHS *4 | ⑤ LESS THAN 5.5m OR NOT KNOWN |
| | | ⑥ 5.5 THROUGH 13m (OR ONE THROUGH 2 LANES) |
| | | ⑦ 13m OR MORE (OR THREE THROUGH 4 LANES) |
| | | ⑧ 5 THROUGH 6 LANES OR MORE |

\*1  1-WAY TRAFFIC IN THE FORWARD DIRECTION MEANS THAT TRAVELING IS ALLOWED ONLY IN THE DIRECTION WHICH CONFORMS TO THE ORDER IN WHICH LINK STRING DATA POINTS ARISE.

\*2  1-WAY TRAFFIC IN THE REVERSE DIRECTION MEANS THAT TRAVELING IS ALLOWED ONLY IN THE DIRECTION WHICH IS REVERSE FROM THE ORDER IN WHICH LINK STRING DATA POINTS ARISE.

\*3  NO TRAFFIC ALLOWED IN BOTH DIRECTIONS MEANS THAT TRAVELING IS NOT ALLOWED EITHER IN THE DIRECTION CONFORMING TO THE ORDER IN WHICH THE LINK STRING DATA POINTS ARISE OR IN THE DIRECTION THAT IS REVERSE.

\*4  THE TOTAL NUMBER OF LANES FOR BOTH FORWARD AND REVERSE DIRECTIONS IS INDICATED AS THE NUMBER OF LANES. WHEN FORWARD DIRECTION LANES AND REVERSE DIRECTION LANES ARE SEPARATED, THE NUMBER OF LANES IS INDICATED SEPARATELY FOR THE FORWARD DIRECTION AND REVERSE DIRECTION.

FIG. 17A

| ATTRIBUTE 1 + X COORDINATE |
|---|
| ATTRIBUTE 2 + Y COORDINATE |

(2 WORDS)

FIG. 17B

| ATTRIBUTE 1 + X COORDINATE |
|---|
| ATTRIBUTE 2 + Y COORDINATE |
| IDENTICAL NODE OFFSET |

(3 WORDS)

FIG. 17C

| ATTRIBUTE 1 + X COORDINATE |
|---|
| ATTRIBUTE 2 + Y COORDINATE |
| IDENTICAL NODE OFFSET |
| GUIDE OFFSET (OR LINK NO.) |

(4 WORDS)

FIG. 17D

| ATTRIBUTE 1 + X COORDINATE |
|---|
| ATTRIBUTE 2 + Y COORDINATE |
| IDENTICAL NODE OFFSET |
| GUIDE OFFSET |
| LINK NO. |

(5 WORDS)

FIG. 18B

| BIT | DETAILS | |
|---|---|---|
| 15, 14 | OFFSET TO IMMEDIATLY PRECEDING | (1) 2 WORDS UP TO THE HEADER POSITION OF THE IMMEDIATELY PRECEDING ELEMENT POINT |
| | | (2) 3 WORDS UP TO THE HEADER POSITION OF THE IMMEDIATELY PRECEDING ELEMENT POINT |
| | | (3) 4 WORDS UP TO THE HEADER POSITION OF THE IMMEDIATELY PRECEDING ELEMENT POINT |
| | | (4) 5 WORDS UP TO THE HEADER POSITION OF THE IMMEDIATELY PRECEDING ELEMENT POINT |

MAP DATABASE APPARATUS

BACKGROUND OF THE INVENTION

1. Field of the Invention

The present invention relates to a map database apparatus which, preferably mounted in a navigation system for vehicles and the like, is used in road map display, map matching, calculation of a recommended route and the like.

2. Description of the Prior Art

Vehicular navigation systems in the known art are provided with a function for displaying a road map of the area where the vehicle is currently located, a function for accurately detecting the vehicle position through map matching, a function for calculating a recommended route from a point of departure to a destination and the like. In these vehicular navigation systems in the prior art, data for road map display, data for map matching and data for route search are separately stored in a storage medium in order to maintain compatibility with existing software programs and also to improve the processing speed.

This means that a large storage capacity is required and, even with CD ROM as the storage medium, it has become difficult to store road map data for the entire nation of Japan on one CD ROM disk. However, if data are stored on a plurality of CD ROM disks, the CD ROM disks will have to be replaced during use, reducing the operability. If, on the other hand, a CD ROM device employing the auto-changer system is used, whereby a plurality of CD ROM disks are automatically changed, the product cost will increase.

FIG. 23 shows the data management method for road map data in the navigation system in the prior art. As shown in the figure, data are managed in units of links which are the minimum unit required for expressing road physical forms and, for each link, node information related to the nodes at both ends of the link is provided. In addition, even though nodes have identical positional coordinates, the nodes are managed with different node nos. for individual links. Information that indicates that adjacent nodes of adjacent links have the same positional coordinates (hereafter referred to as identical node information) is provided separately. For instance, in FIG. 23, information C12 and C21 are provided, which indicate that node N1*b* of link L1 and node N2*a* of link L2 are equal to each other.

FIG. 24 shows the range of an intersection where a plurality of roads intersect. In a case such as that presented in FIG. 24, in the prior art, each road is divided at the intersection being the boundary into separate links respectively, as shown in FIG. 25, and separate nodes are assigned to the intersection for each road. In addition, identical node information, which indicates that nodes N0*a*, N0*b*, N0*c*, N0*d* and N0*e* have the same positional coordinates, is provided separately.

Since the identical node information described above must be provided at each location where links are connected, many sets of identical node information are required for the entire road map. Thus, a large quantity of data is required for the identical node information alone, and this is a significant factor in the increase in storage capacity requirement of the storage medium, such as CD ROM.

SUMMARY OF THE INVENTION

The object of the present invention is to provide a map database apparatus which can perform road map display, map matching and route search with a small quantity of data. The present invention achieves this object by providing the following map database apparatuses.

According to the 1st aspect of the present invention, the map database apparatus has a storage device in which link string data is stored. A road on a map represented by a plurality of links and a plurality of nodes is expressed as the link string data, the links representing minimum units of the road, the nodes being at a start point and an end point of each of the plurality of links. The link string data has node information relating to the nodes. The node information is shared with adjacent links. Consequently, the number of sets of node information can be reduced compared to the prior art and the total memory requirement for the map database can be reduced.

According to the 2nd aspect of the present invention, the node information includes identifying information for identifying a link connected to the node and position information related to a position of the node on the map.

According to the 3rd aspect of the present invention, the node information of the link string data is stored in a memory area of the storage device in an order such that the links are lined up in one direction to form a road on a map.

According to the 4th aspect of the present invention, the node information can include a storage position of immediately preceding node information so that the link string data can be read out in a direction reverse from the one direction.

According to the 5th aspect of the present invention, the link string data includes interpolation point position information for interpolating a link physical form by further dividing one of the links into a plurality of portions and position information on individual interpolation points is stored in a memory area of the storage device in a direction in which the links are lined up in one direction to form a road on a map.

According to the 6th aspect of the present invention, the interpolation point position information can include a storage position of immediately preceding interpolation point information or immediately preceding node information so that the set of link string data can be read out in a direction reverse from the one direction.

According to the 7th aspect of the present invention, the map is partitioned into a plurality of areas and among roads within one partitioned area, roads of identical type are grouped to constitute one link string data. Consequently, it is easy to change the display mode according to road classification, for example.

According to the 8th aspect of the present invention, the roads of identical type refer to roads assigned with an identical number, such as a national highway or a prefectural road.

According to the 9th aspect of the present invention, when two or more of the link string data are stored in memory for the one partitioned area and the link string data each have node information which has identical position information, the node information having the identical position information in the one link string data includes offset data which indicates a storage position of node information having the identical position information in another one of the link string data. Consequently, even if a plurality of sets of node information concerning an identical node exist, the corresponding relationships between them can be ascertained easily, and the road physical forms at a point where a plurality of roads intersect or the like can be displayed accurately.

According to the 10th aspect of the present invention, it is preferable that when node information of the one link string data does not have position information identical to position information of node information of the another link string data, specific information indicating that the node information of the one link string data does not have position information identical to position information in the another link string data is stored in a memory area, in which the offset information is stored, for the node information of the one link string data. By doing this, the detection of whether or not there are other identical nodes is facilitated.

According to the 11th aspect of the present invention, the node information can include traffic regulation information for links to be connected to a corresponding node.

According to the 12th aspect of the present invention, the node information can include road width information for links to be connected to a corresponding node.

According to the 13th aspect of the present invention, the node information can include number of lanes information for links to be connected to a corresponding node.

According to the 14th aspect of the present invention, the link string data can include altitude information indicating altitudes in the plurality of links. Consequently, a road map can be displayed three dimensionally.

According to the 15th aspect of the present invention, it is preferable that the altitude information for all of the plurality of links in one link string data is stored together in memory at an end of the set of link string data. This causes that the altitude information never needs to be read out when displaying a flat map, and the data read is not restricted by the necessity of handling altitude information.

According to the 16th aspect of the present invention, the map database apparatus has a storage device in which route search data is stored, wherein: a road on a map represented by a plurality of links and a plurality of nodes is expressed as link string data, the links representing minimum units of the road, the nodes being at a start point and an end point of each of the plurality of links; the route search data has home node information of an identical node of a one the link string data, position information of the identical node being identical to position information of a node of another the link string data, and adjacent node information of a node which is adjacent to the identical node.

According to the 17th aspect of the present invention, the route search data are stored in a memory area of the storage device in an order in which the plurality of links are lined up in one direction to form a road on a map. Consequently, even without including the node no. of the home nodes as part of the node information of the home nodes, the node no. of the home nodes can be detected with ease.

According to the 18th aspect of the present invention, the adjacent node information can have identifying information for identifying adjacent nodes and information related to links from the identical node to an adjacent node.

According to the 19th aspect of the present invention, the information related to links from the identical node to the adjacent node can include link cost and/or traffic regulation information. In this case, the accuracy of the route search is improved.

According to the 20th aspect of the present invention, it is preferable that the link string data are stored in memory for each of various maps at different map scales, and the link string data corresponding to each other between the various maps are stored with common identifying information. Consequently, the corresponding relationships among sets of link string data at different map scales can be ascertained easily.

According to the 21st aspect of the present invention, the map database apparatus, in which a road on a map represented by a plurality of links and a plurality of nodes is expressed as link string data, the links represent minimum units of the road, and the nodes are at a start point and an end point of each of the plurality of links, has: a first storage device which stores node information constituted with identifying information for identifying the plurality of links and position information for the nodes shared by adjacent links as map display data; and a second storage device which stores home node information for an identical node of one the string data, position information of the identical node being identical to position information of nodes of another the link string data, and adjacent node information for representing a node adjacent to the identical node as route search information.

According to the 22nd aspect of the present invention, it is preferable that the first storage device and the second storage device store various types of information using identifying information shared by corresponding link string data for each of various maps at different map scales.

BRIEF DESCRIPTION OF THE DRAWINGS

FIG. 9 shows an example in which two roads intersect in a meshed range.

FIG. 12 shows the link string data of the road indicated with the bold lines in FIG. 11.

FIG. 15B shows traffic regulation information, road width information and number of lanes information added to the link string data.

FIGS. 17A thorough 17D show varying data volumes of node information and interpolation point information.

FIG. 18B shows offset information to be added to the link string data to read out immediately preceding data.

DESCRIPTION OF THE PREFERRED EMBODIMENT

Figure 1:
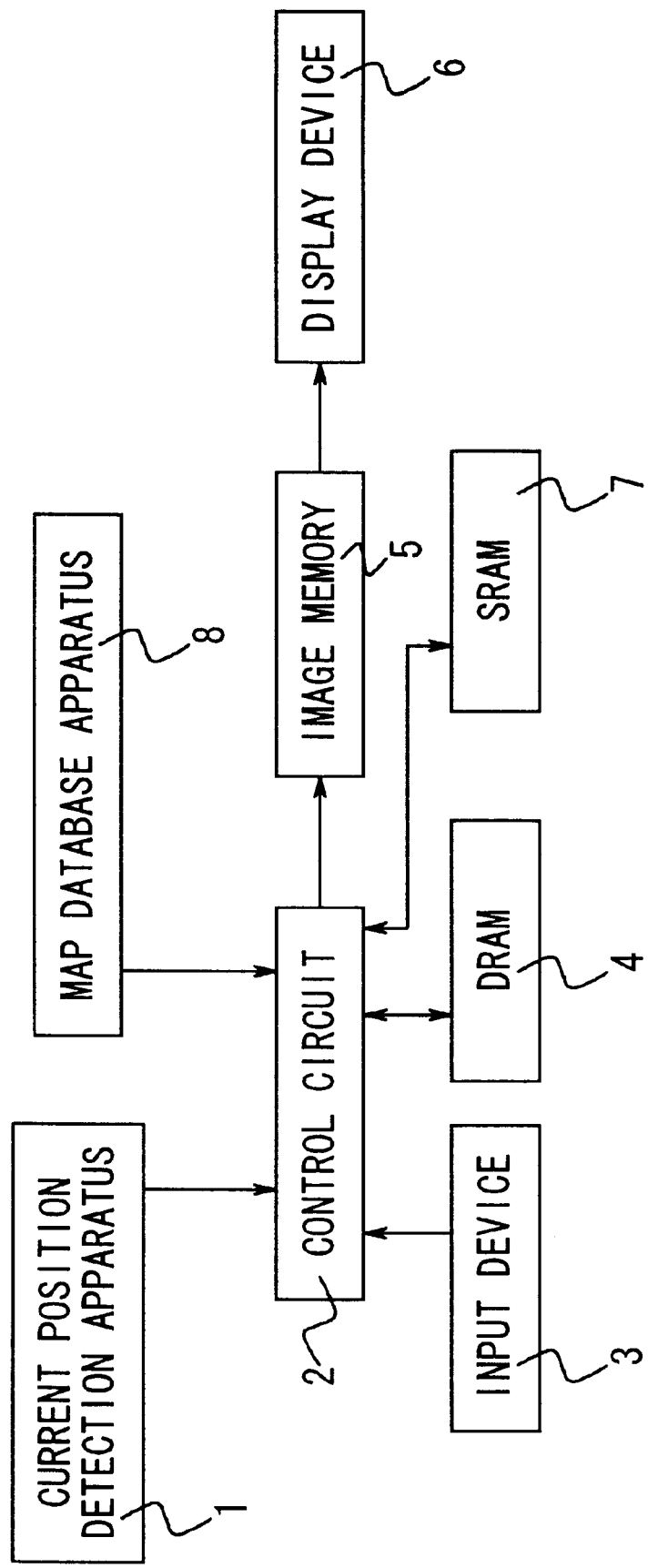
FIG. 1 shows a block diagram of an embodiment of a navigation system for vehicles in which a map database apparatus according to the present invention is mounted.

FIG. 1 is a block diagram of an embodiment of a navigation system for vehicles that is internally provided with a map database apparatus according to the present invention. In FIG. 1, reference number 1 indicates a current position detection apparatus that detects the current position of a vehicle, which is constituted with, for instance, an azimuth sensor which detects the azimuth of a vehicle during travelling, a vehicle speed sensor that detects the speed of the vehicle, a GPS sensor which detects a GPS signal from a GPS (Global Positioning System) satellite and the like.

Reference number 2 indicates a control circuit that controls the entire system and is constituted with a microprocessor and peripheral circuits. Reference number 3 indicates an input apparatus for inputting destinations and the like for vehicles, reference number 4 indicates a DRAM that stores vehicle position information and the like detected by the current position detection apparatus 1, reference number 5 is an image memory that stores image data for display on a display device 6 and image data stored in the image memory 5 are read out as necessary to be displayed on the display device 6. Reference number 7 indicates an SRAM that stores node information, link information and the like on the recommended route calculated by the control circuit 2.

Reference number 8 indicates a map database apparatus that stores various types of data for performing road map display, route search, map matching and the like, which is constituted with, for instance, a CD ROM device, a magnetic recording device and the like. In the map database apparatus 8, map display data that are constituted with information related to road physical forms, road classifications and the like, and route search data that are constituted with branching point information, intersection information and the like that are not directly related to road physical forms, are stored. The map display data are mainly used when displaying a road map on the display device and the route search data are mainly used when calculating a recommended route. Both data will be explained in detail after.

Also, both the map display data and the route search data include a plurality of sets of data at varying scales and, in this embodiment, the data for each scale is referred to as data at level n (n may be, for instance, 1 through 5). An example in which route search is performed using map display data and route search data at levels 2 and 4 of these levels, is explained below. Note that a road map at level 1 is the most detailed, and as the level number goes up the amount of detail decreases and the road map becomes a wider range map. Also, in this embodiment, link nos. and node nos. are used commonly at various levels to facilitate the handling of corresponding data at varying levels.

Figure 2:
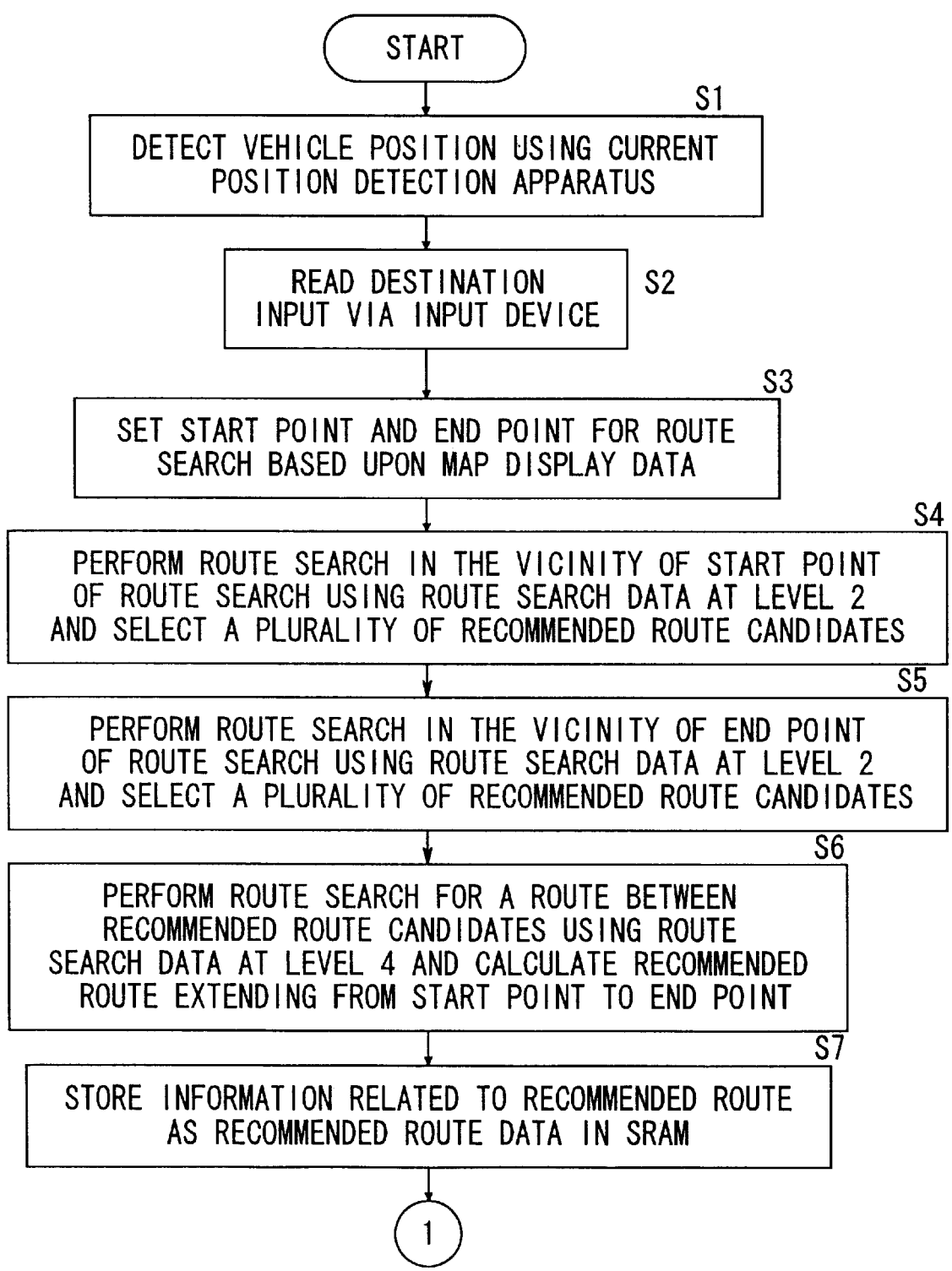
FIG. 2 shows a flow chart outlining the main processing performed by a control circuit.
Figure 3:
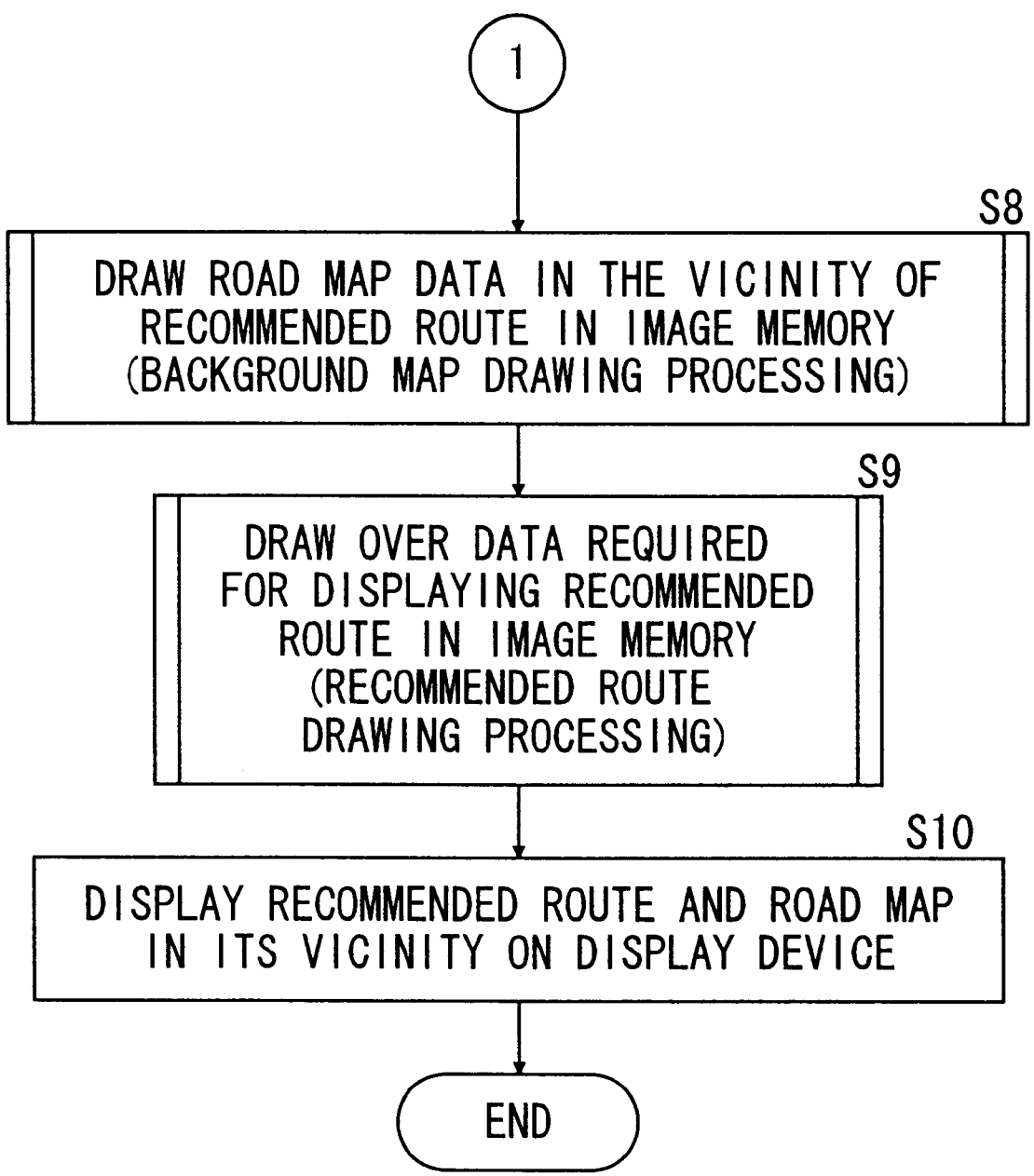
FIG. 3 shows a flow chart continuing from FIG. 2.

FIGS. 2 and 3 are a flow chart which illustrates the outline of the main processing performed by the control circuit 2. In step S1 in FIG. 2, the vehicle position is detected by the current position detection apparatus 1. In step S2, the destination, which has been input via the input apparatus 3, is read in. In step S3, based upon the map display data stored in the map database apparatus 8, the start point and the end point of the route search are set on roads for which route search is possible. For instance, the start point is the current position of a vehicle and the end point is the destination.

In step S4, using route search data at level 2, route search in the vicinity of the start point of the route search is performed, and a plurality of candidates for the recommended route in the vicinity of the start point are selected. In step S5, using route search data at level 2, route search in the vicinity of the end point of the route search is performed, and a plurality of candidates for the recommended route in the vicinity of the end point are selected.

In step S6, using route search data at level 4, route search is performed for routes between the candidates for the recommended routes selected in step S4 and step S5, and a recommended route from the start point to the end point is calculated.

Route search data at different levels are used for the vicinities of the start point and the end point, and the middle range between the start point and the end point in this manner because if route search is performed using route search data at level 2 for the entire route, the data quantity will be very large and, as a result, the calculation time required in route search will increase. In step S7, the information related to the recommended route calculated in step S6 is stored in the SRAM 7 as recommended route data.

Figure 4:
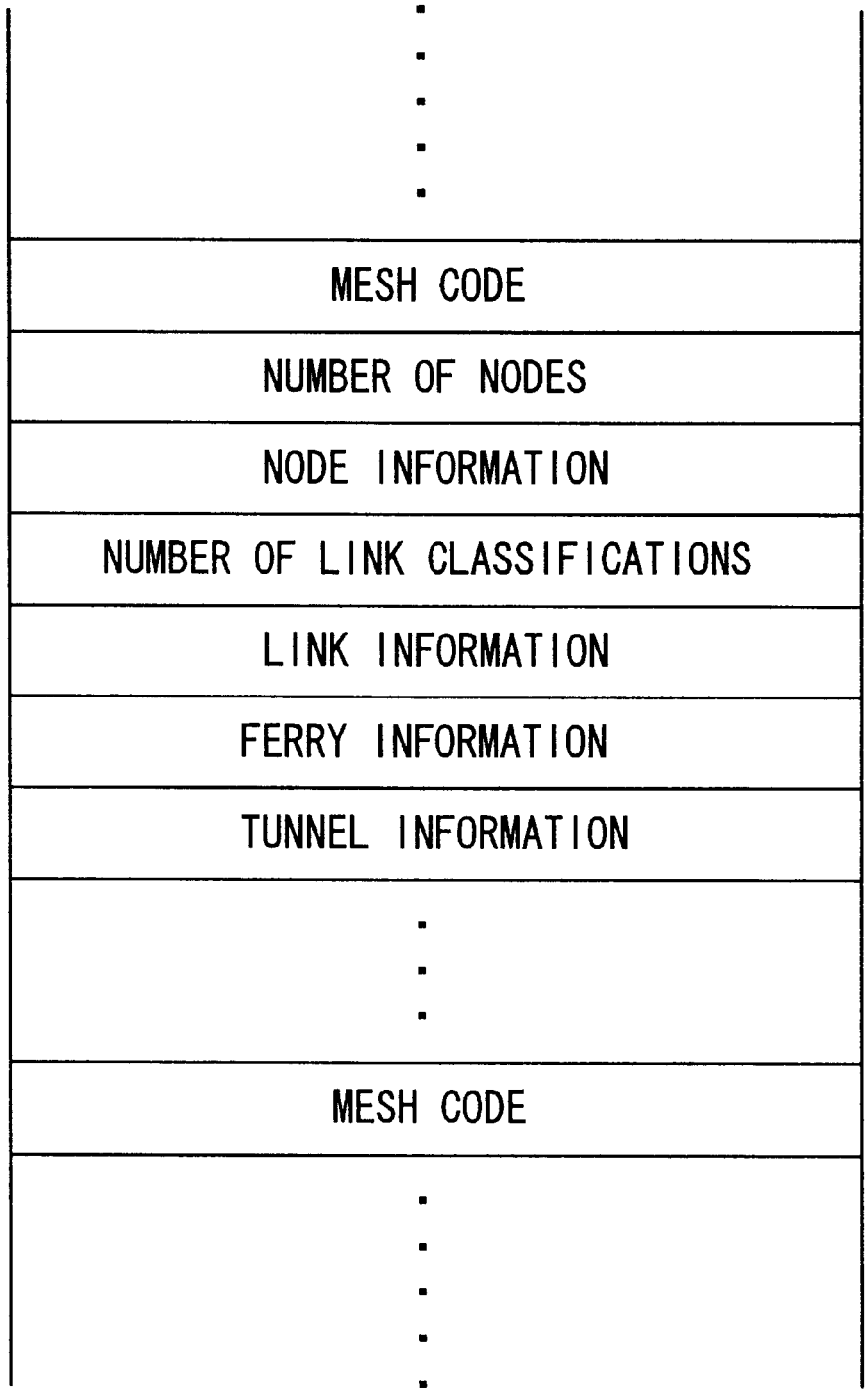
FIG. 4 shows an outline of the data structure of recommended route data.

FIG. 4 shows an outline of the data structure of recommended route data. In the recommended route data, node information and link information on the recommended route are stored, while classified in units of meshed ranges. Note that a meshed range refers to a partitioned range when a road map is partitioned into units of specific ranges.

Figure 5:
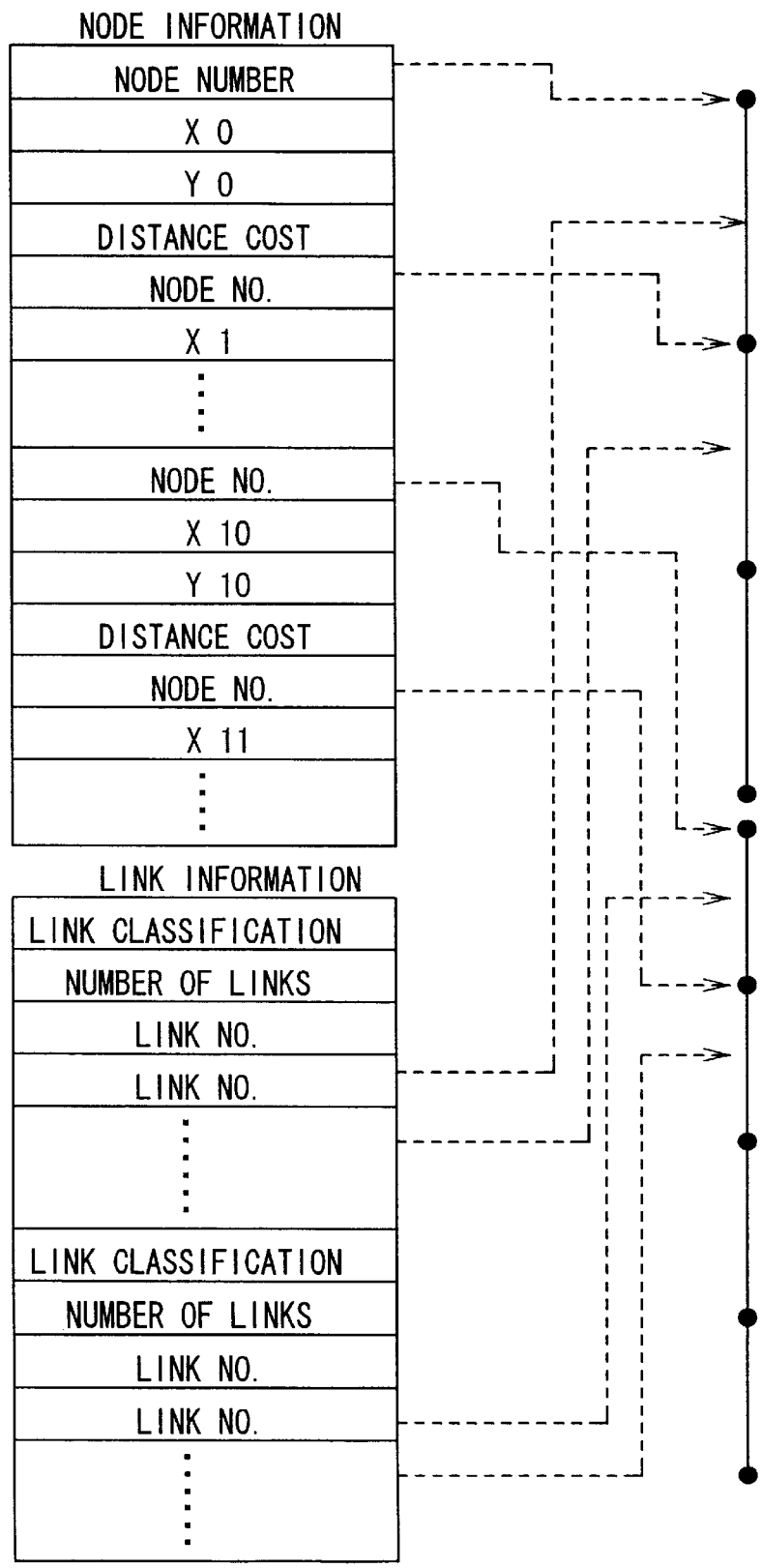
FIG. 5 shows the data structure of node position information and link position information.

As shown in FIG. 4, the recommended route data are constituted with mesh code, the number of nodes, node information, the number of link classifications, link information, ferry information and tunnel information. The number for identifying the meshed range is stored in a storage area of the mesh code, the number of nodes present within a meshed range is stored in a storage area of the number of nodes and, as shown in detail in FIG. 5, the node no. and the positional coordinates and the like of each node within a meshed range are stored in a storage area of the node information. In addition, the number of link classifications that are present inside a meshed range is stored in a storage area of the number of link classifications and as shown in detail in FIG. 5, the link specification, link no. and the like of each link within a meshed range are stored in a storage area of the link information.

Note that recommended route data are prepared at different levels and, in this embodiment, recommended route data at level 2 are prepared for the vicinities of the start point and the end point on the recommended route while recommended route data at level 4 are prepared for the middle range between the start point and the end point, as described above.

Figure 6:
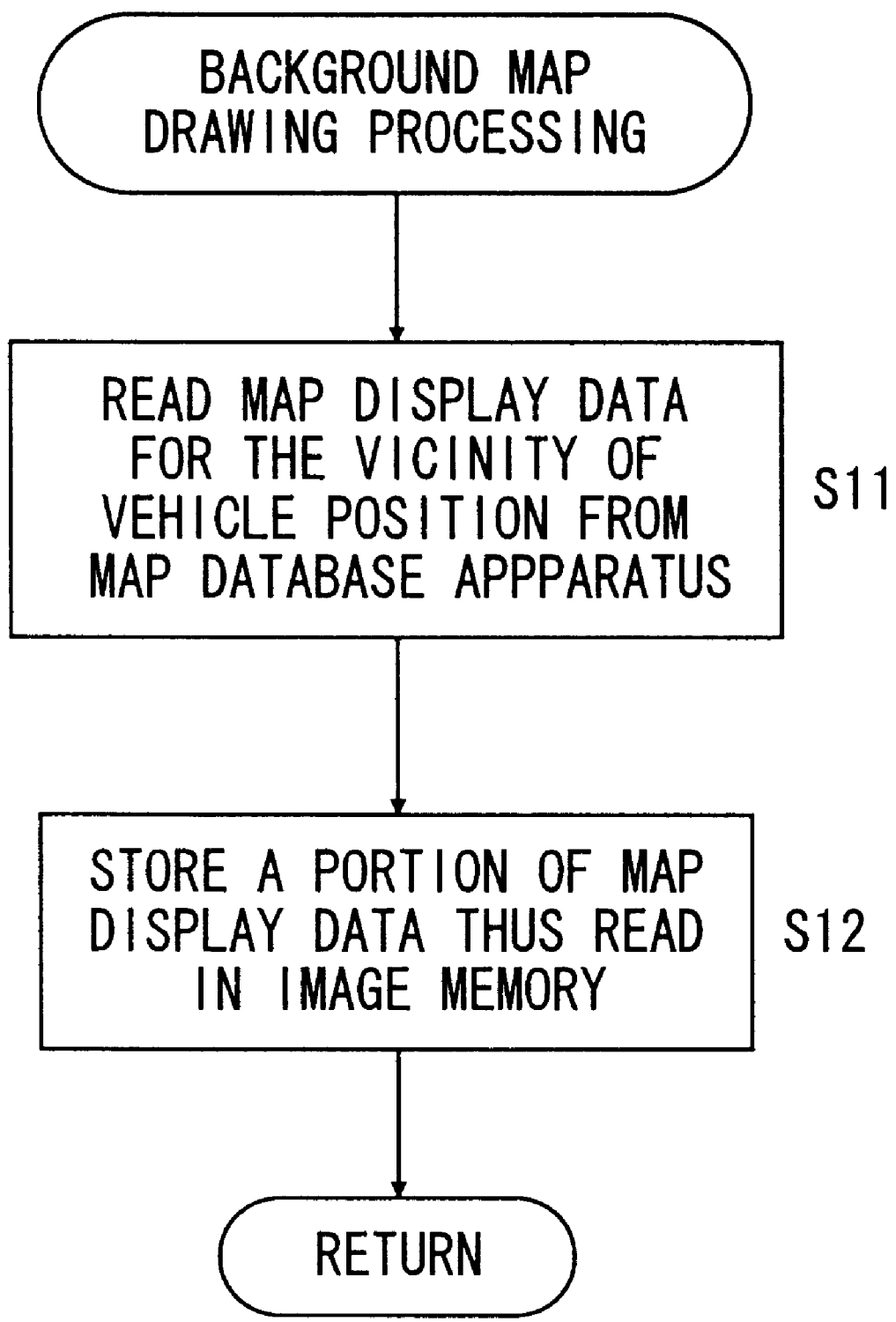
FIG. 6 shows a detailed flow chart of the background map drawing processing performed in step S8 in FIG. 3.

When the processing performed in step S7 in FIG. 2 is completed, the operation proceeds to step S8 shown in FIG. 3, in which the background map drawing processing, the details of which are shown in FIG. 6, is performed to draw (store) data related to the road map in the vicinity of the recommended route for display on the display device 6 in the image memory 5. First, in step S11 in FIG. 6, map display data corresponding to the vicinity of the current vehicle position are read from the map database apparatus 8. Next, in step S12, a portion of the map display data thus read, is drawn (stored) in the image memory 5.

When the processing performed in step S12 in FIG. 6 is completed, the operation proceeds to step S9, shown in FIG. 3, in which the data required to display the recommended route calculated in step S3 are also drawn over (stored) in the image memory 5. The recommended route drawing processing performed in step S9 is described in more detailed later. In step S10, the data stored in the image memory 5 are read out and the recommended route and the road map in the vicinity are displayed on the display device 6.

Figure 7:
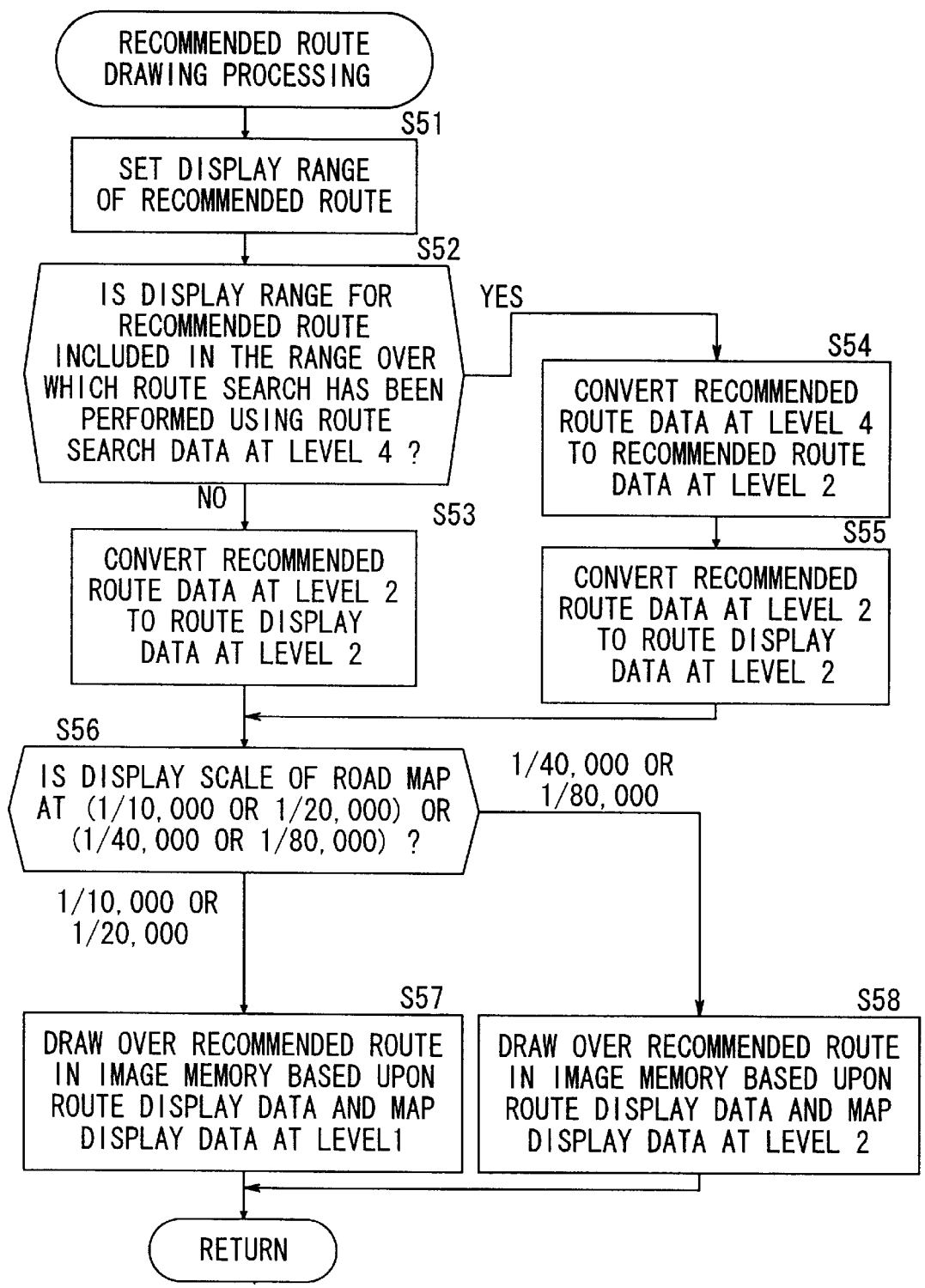
FIG. 7 shows a detailed flow chart of the recommended route drawing processing performed in step S9 in FIG. 3.

FIG. 7 is a detailed flow chart of the recommended route drawing processing performed in step S9 in FIG. 3. In step S51 in FIG. 7, in correspondence to the road map range to be displayed on the display device 6, the display range of the recommended route is set. In step S52, a decision is made as to whether or not the display range of the recommended route is included in the range over which the route search was performed using the route search data at level 4. If a negative decision is made, the operation proceeds to step S53 to convert the recommended route data at level 2 stored in the SRAM 7 to route display data at level 2.

Figure 8A:
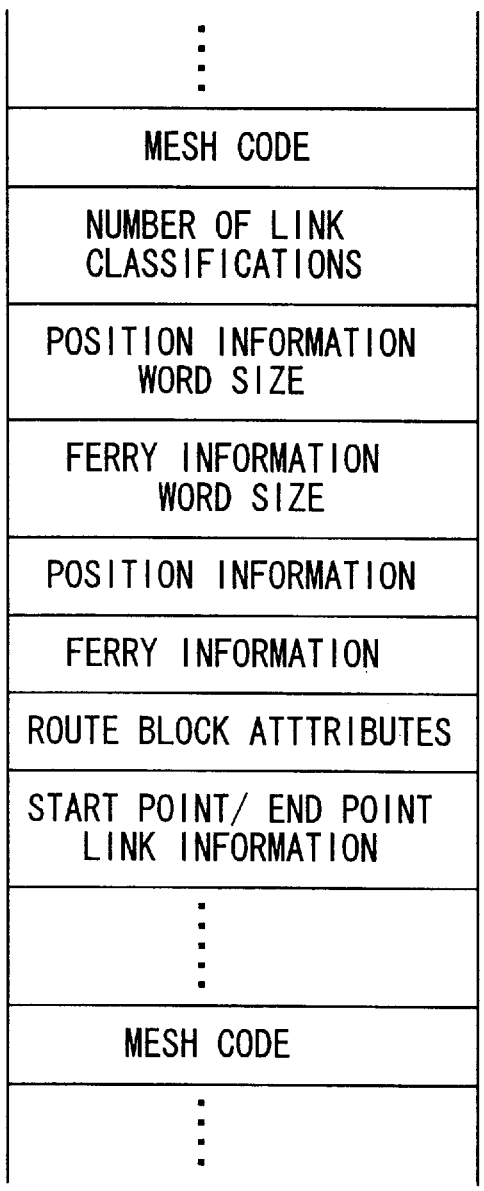
FIGS. 8A and 8B show the data structure of route display data.
Figure 8B:
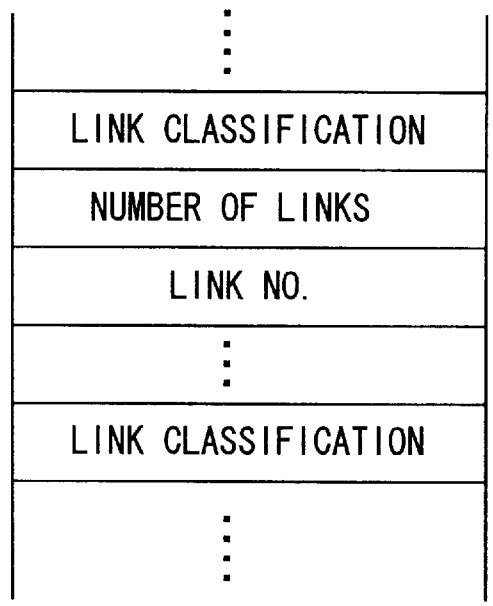

FIG. 8A shows the data structure of the route display data. As shown in the figure, route display data are constituted with mesh code, the number of link classifications, position information word size, ferry information word size, position information, ferry information, route block attributes and start point/end point link information. Of these components, the link classification, the number of links and the link nos. are stored in a storage area of the position information for each link, as shown in detail in FIG. 8B. In a storage area of the ferry information, the positional coordinates and the like of the ferry ports within the meshed range are stored. In addition, in a storage area of the start point/end point link information, link information corresponding to the vehicle position and the vicinity of the destination is stored.

If, on the other hand, an affirmative decision is made in step S52 in FIG. 7, the operation proceeds to step S54 to convert the recommended route data at level 4 stored in the SRAM 7 to recommended route data at level 2. In step S55, the recommended route data at level 2 are converted to route display data at level 2.

When the processing performed in step S53 or S55 in FIG. 7 is completed, the operation proceeds to step S56, in which a decision is made as to whether the display scale of the road map is set at (1/10,000 or 1/20,000) or (1/40,000 or 1/80,000). If the setting is at (1/10,000 or 1/20,000), the operation proceeds to step S57, in which the recommended route is drawn over in the image memory 5, based upon the route display data and the road classifications and the link nos. in the map display data at level 1.

If, on the other hand, a decision is made in step S56 that the scale is set at (1/40,000 or 1/80,000), the operation proceeds to step S58, in which the recommended route is drawn over in the image memory 5 based upon the route display data and the road classifications and the link nos. in the map display data at level 2.

Next, the data structures of the map display data and the route search data stored in the map database apparatus 8 are described.

[1] Map display data
(1) Overview of link string data

Data management of the map display data in this embodiment is performed for each meshed range representing one of the partitioned areas of a road map corresponding to specific ranges, and individual roads present in a meshed range constitute separate link strings. For instance, as shown in FIG. 9, when two routes intersect, in one meshed range, the two roads constitute 2 separate link strings A and B. The link string A is constituted with links A1 and A2, and the link string B is constituted with links B1 and B2. In this case, the links A1 and A2 of the link string A and the links B1 and B2 of the link string B have an identical road classification, for instance a national highway. Each of the links A1 through B2 is a minimum unit to express a road, and these links are distinguished from one another with inherent numbers (hereafter referred to as link nos.) assigned to individual links.

Figure 10:
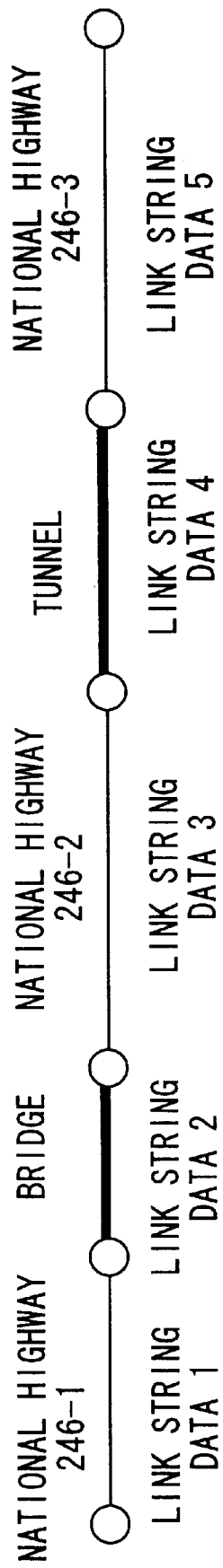
FIG. 10 shows an illustration of link string units.

Also, in this embodiment, when there is a distinct structure such as a bridge, a tunnel or the like, on a road, the portions of the road preceding and following the structure constitute separate link strings. For instance, when there is a bridge and a tunnel on National Highway 246, as shown in FIG. 10, the portions preceding the bridge and the tunnel, the blocks corresponding to the bridge and the tunnel and the portions following the bridge and the tunnel all constitute separate link strings. In FIG. 10, these strings are designated by link string data 1 through 5. By making the portions preceding and following a distinctive structure on a road separate link strings, search of bridges, tunnels and the like on a road map is facilitated.

(2) Data structure of link string data

Figure 11:
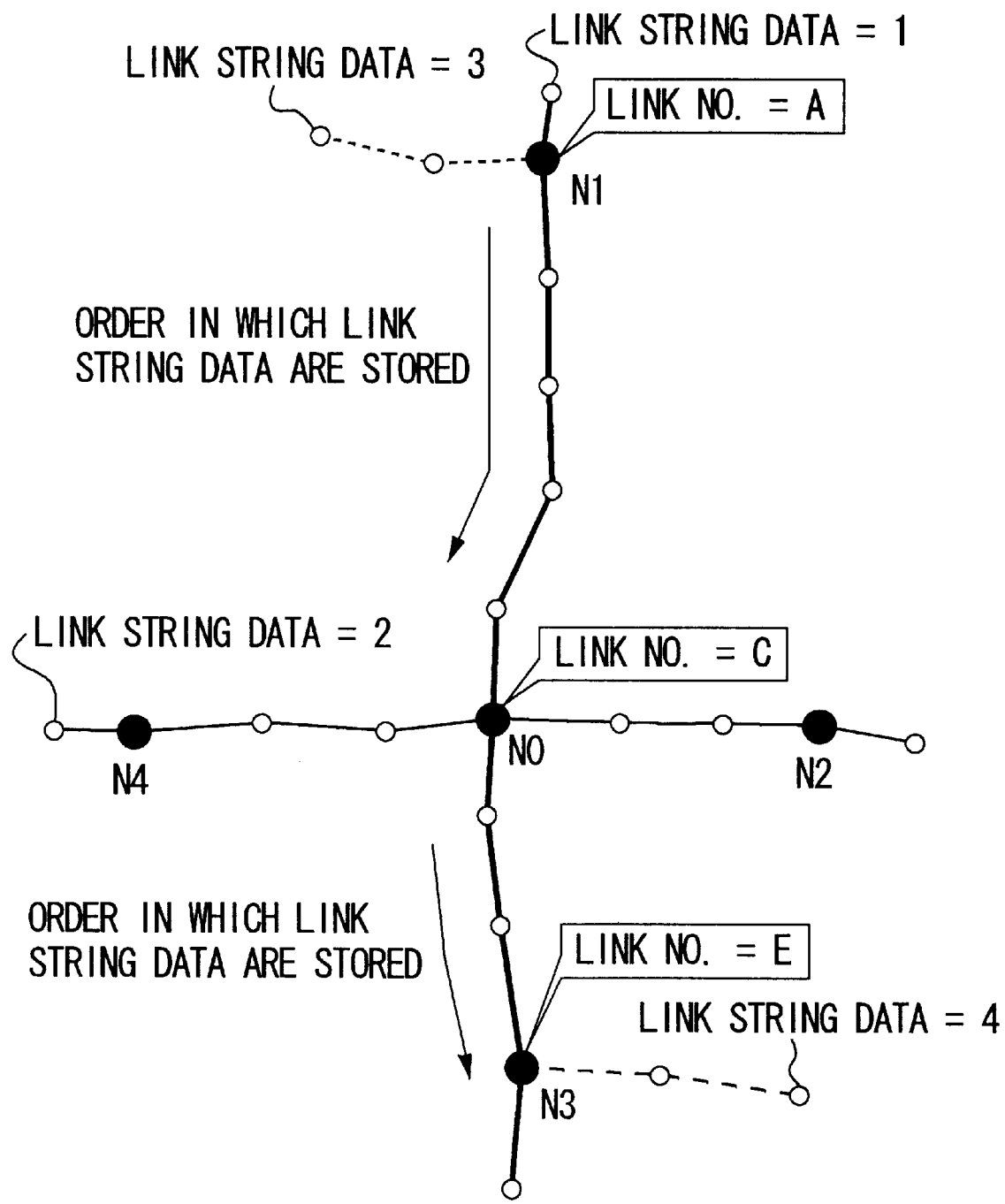
FIG. 11 shows an example of a road map with a plurality of nodes and a plurality of interpolation points.

In the map display data, link string data which describe various types of information related to the link string are provided for each link string. For instance, the link string data for the link string indicated with the bold lines in FIG. 11, are structured as shown in FIG. 12. As shown in the figure, the link string data are constituted with node information which is related to nodes (points indicated with black circles in FIG. 11) on a link string and interpolation point information, which is related to interpolation points (the points indicated with white circles in FIG. 11). Node information includes the positional coordinates X, Y of the nodes and the link nos. of the links to be connected to the nodes. Interpolation point information includes the positional coordinates X, Y of the interpolation points. A road indicated with the bold lines in FIG. 11 is link string data no.1. A link of link no. A is between node N0 and node N3. A link of link no. C is between node N0 and node N0. Information of node N0 is jointly owned by the link of link no. A and the link of link no. C. The information, i.e., the node information and the interpolation point information, is set in an order of connections of links in data arrangement. Because of this, by reading out link string data sequentially from the starting address, the road physical forms, the road classification and the like for the entire link string can be detected.

Thus, in this embodiment, since data are managed in units of link strings and position information of a node between adjacent links is jointly owned by the links in one meshed range, the entire volume of data can be reduced in comparison to the prior art, in which data are managed in units of links.

(3) Offset information for indicating identical nodes

Figure 13:
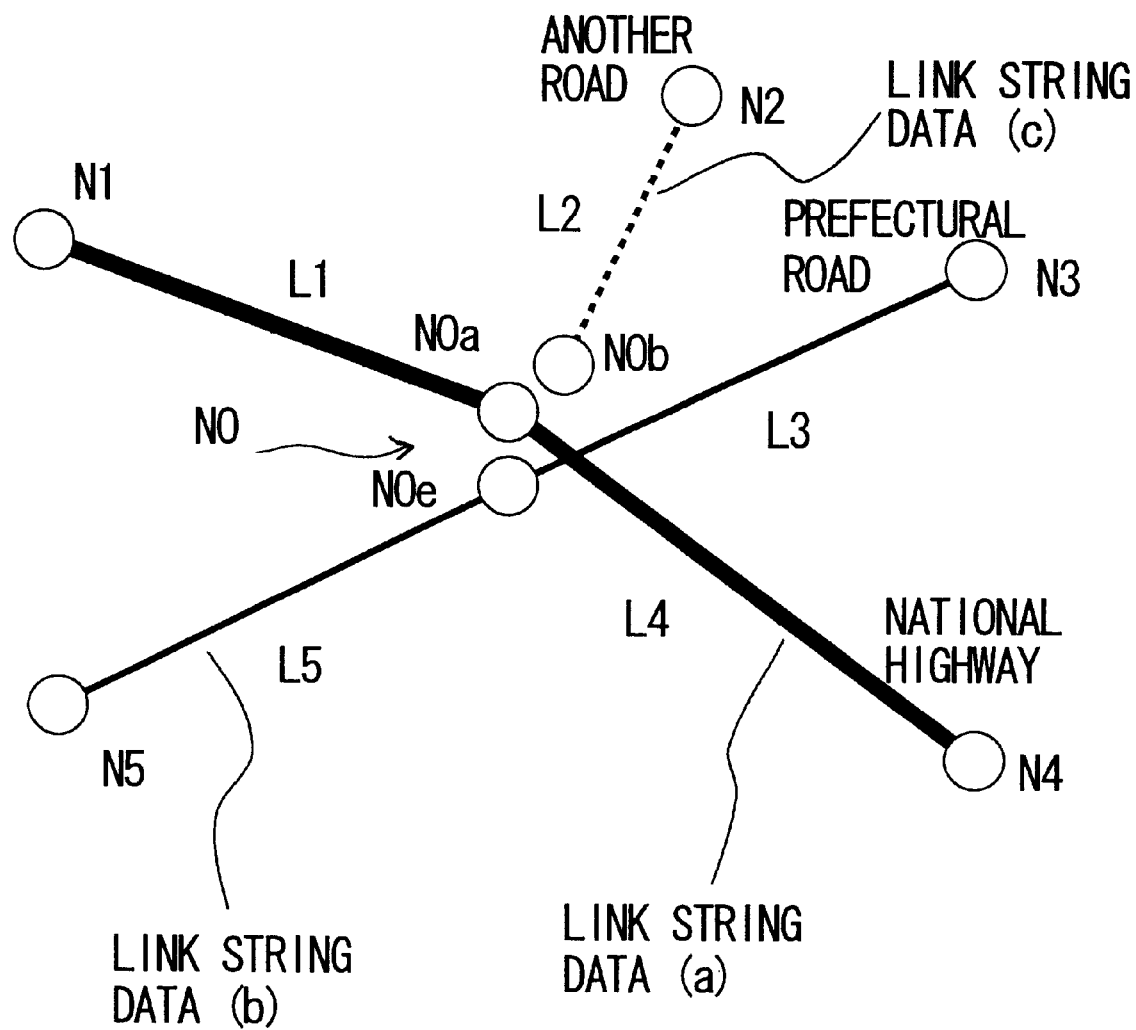
FIG. 13 shows the data management method employed in this embodiment that corresponds to the road map in FIG. 24.
Figure 14:
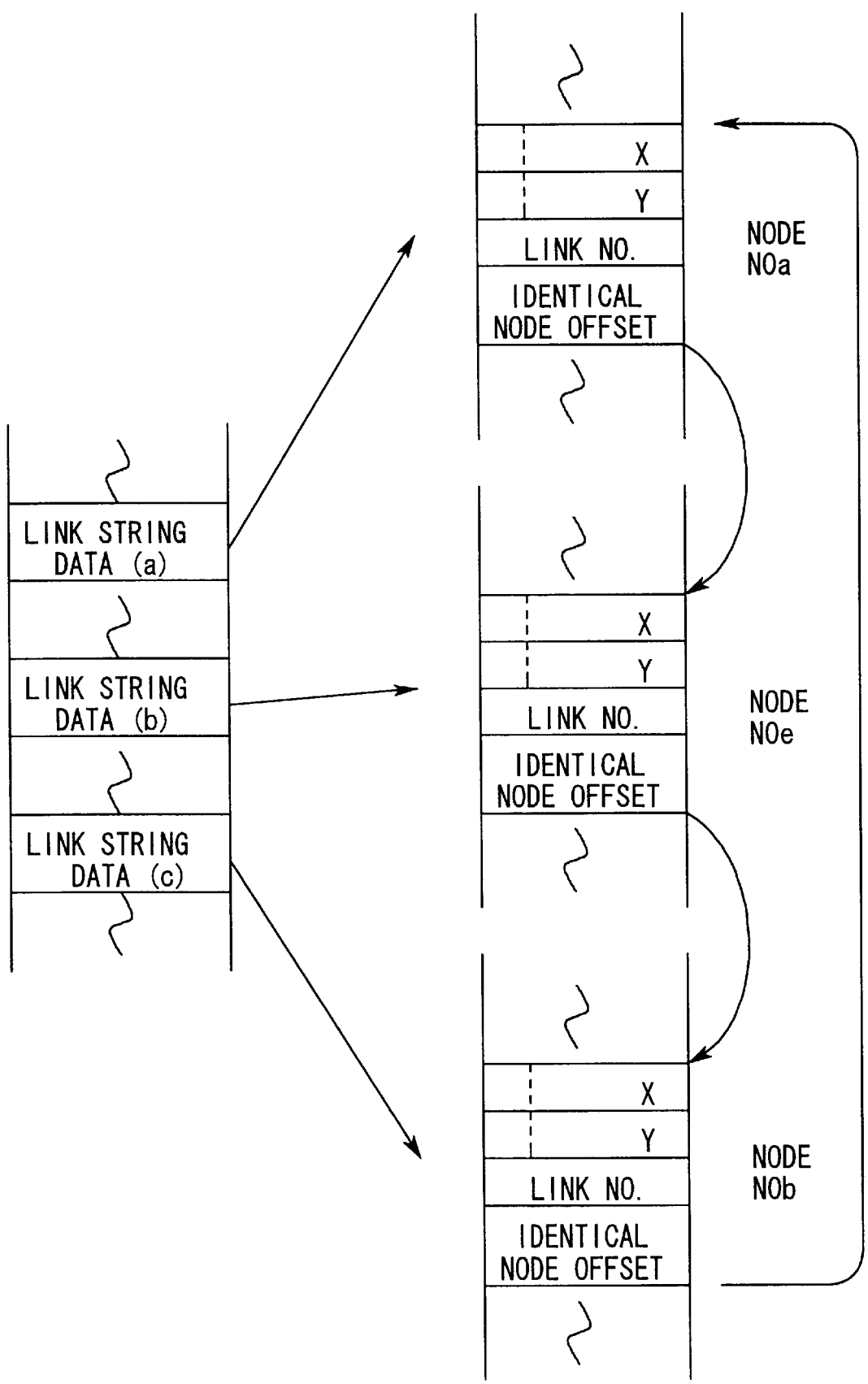
FIG. 14 shows the data structure of the link string data which corresponds to FIG. 13.

The data structure of the map display data which corresponds to FIG. 13 is as shown in FIG. 14. As shown in the figure, link string data (a) on a national highway, link string data (b) on a prefectural road and link string data (c) on a general road are set together in data arrangement. The link string data (a) is constituted with links L1 and L4, and nodes N1, N0a and N4. The link string data (b) is constituted with links L3 and L5, and nodes N3, N0c and N5. The link string (c) is constituted with link L2 and nodes N2 and N0b. Management of the intersection N0 is performed with separate sets of node information attached to the individual sets of link string data. In other words, the link string data (a) is assigned to the node N0a, the link string data (b) is assigned to the node N0c, and the link string data (c) is assigned to the node N0b. Those sets of node information for the intersection N0a through N0c each include a data item which is referred to as identical node offset.

For instance, the address value that indicates a storage area of the node information in the link string data (b) is stored as the identical node offset of the link string data (a), and likewise, the address value which indicates a storage area of the node information in the link string data (c) is stored as the identical node offset of the link string data (b), and also, the address value indicating a storage area of the node information in the link string data (a) is stored as the identical node offset cf the link string data (c).

As for nodes other than the intersection N0 in FIG. 13, since they do not intersect other roads, in a storage area of the identical node offset of node information for these nodes, a specific value, i.e., FFFFh, that indicates that another node relating to an identical node does not exist is stored.

Figure 25:
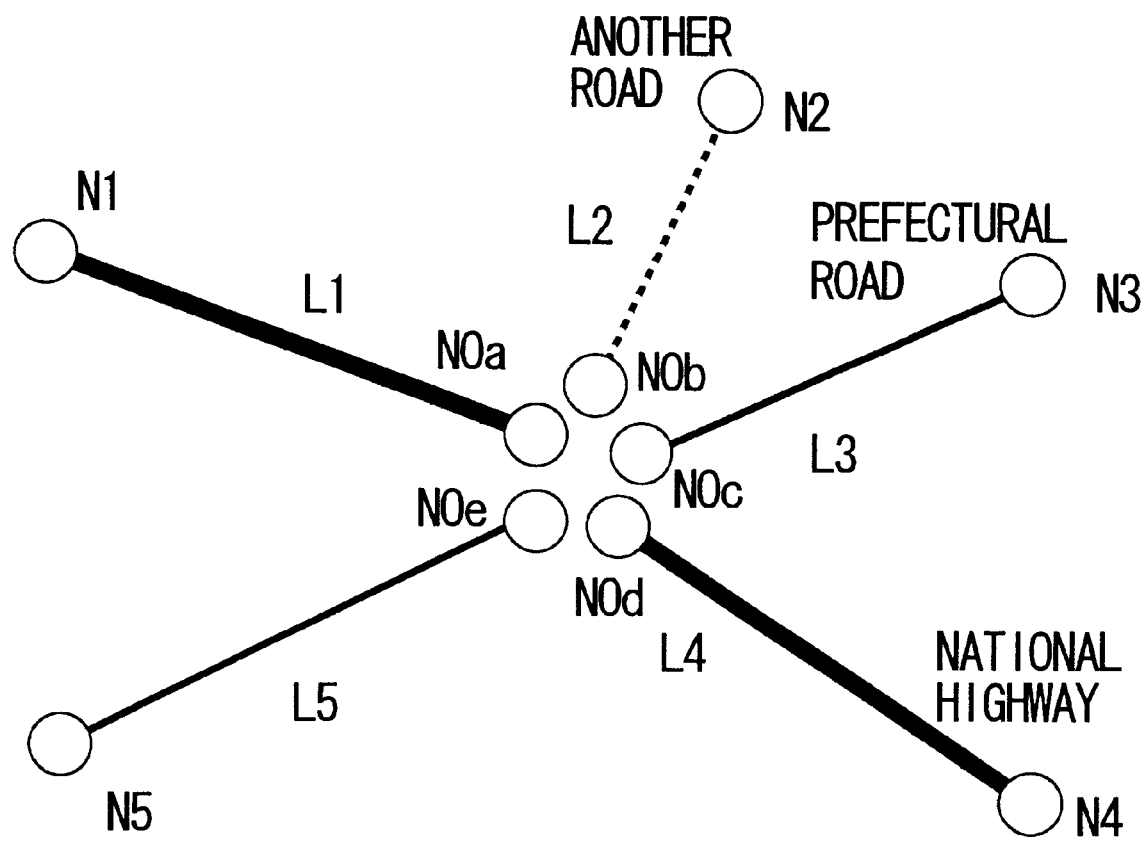
FIG. 25 shows designation of the portions of each road preceding and following an intersection as separate links.

By providing the identical node offset in this manner, even when there are a plurality of sets of node information in regard to identical nodes, the corresponding relationships among the individual sets of node information can be easily ascertained. Also, in contrast to an apparatus in the prior art shown in FIG. 25, which requires 5 nodes corresponding to the intersection N0, only 3 nodes are required in this embodiment, as shown in FIG. 13, achieving a reduction in the data volume.

Figure 15A:
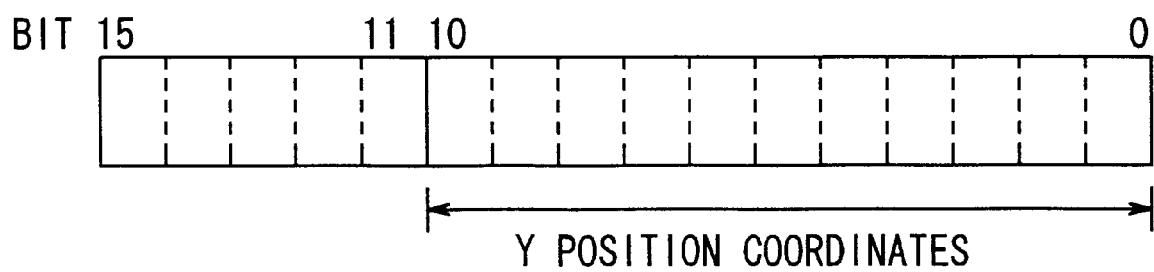
FIG. 15A shows an example of the data structure of the link string data.

(4) Traffic regulation information, road width information, number of lanes information The data length of each set of data constituting link string data is 16 bits (2 bytes=1 word) and the positional coordinates of nodes and interpolation points and the like are stored in the lower order 11 bits of each set of data with various types of attribute information stored in the upper order 5 bits. FIG. 15A shows an example in which the Y positional coordinates are stored in the lower order 11 bits, with traffic regulation information, road width information and number of lanes information stored in the upper order 5 bits. The upper order 5 bits are combined in a specific manner to select one type of information among types 1 through 8 in FIG. 15B.

Since the road width information, the traffic regulation information and number of lanes information are stored by utilizing unused bits of the 2-byte data for storing positional coordinates and the like of nodes in this manner, the road width information, the traffic regulation information and the like can be added to the link string data without increasing the volume of data.

(5) Offset information for reading out link string data in reverse direction

As explained earlier, the node information and the interpolation point information are set in the data arrangement in an order of actual connections of links in link string data. Because of this, by reading out the link string data from the start sequentially, the road physical forms can be accurately ascertained starting from the start position.

Figure 16:
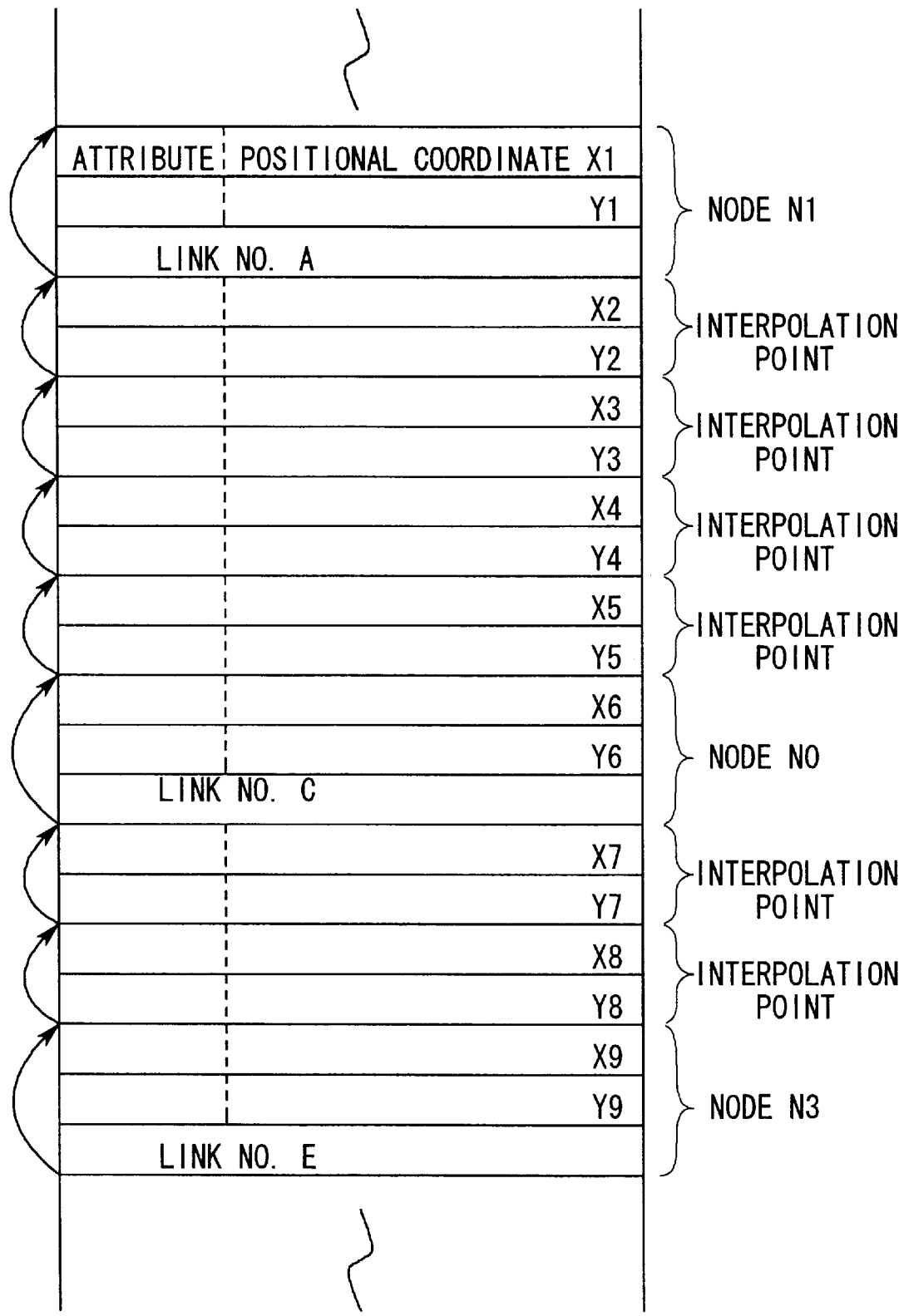
FIG. 16 shows the read method employed when reading out link string data from the end.

There are also situations in which it is necessary to ascertain the road physical forms from the end by reading out the link string data from the end. In such a case, after reading out the node information or the interpolation point information, the header position of the node information or the like that is set immediately before in data arrangement must be detected. For instance, when reading out the link string data for the road indicated with the bold line in FIG. 11 from the end, it is necessary to first read out the node information on the node N3 and then to detect the header position of the interpolation point information that is set immediately before in the data arrangement to read out the interpolation point information from this header position, as indicated with the arrows in FIG. 16. However, as explained below, the data volume of the node information and the interpolation point information varies among various nodes and interpolation points, and the header positions of node information and interpolation point information cannot be determined uniformly.

FIGS. 17A through 17D show varying data volumes of node information and interpolation point information, with FIG. 17A representing a case in which node information or the like is constituted with two words, i.e., the X and Y positional coordinates, FIG. 17B representing a case in which node information or the like is constituted with three words by adding identical node offset to the two words in FIG. 17A, FIG. 17C representing a case in which node information or the like is constituted of four words by adding guide offset information to the three words in FIG. 17B and FIG. 17D representing a case in which node information or the like is constituted of five words by adding link no. to the four words in FIG. 17C.

As shown in FIGS. 17A through 17D, since the data volume of node information or interpolation point information changes for various cases, the information that indicates the header positions of the node information and the interpolation point information is added to the link string data in advance in this embodiment.

Figure 18A:
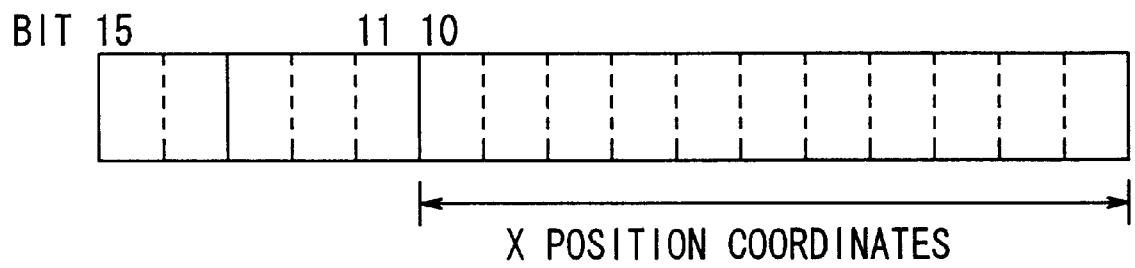
FIG. 18A shows an example of the link string data.

FIG. 18A shows an example in which the X positional coordinates are stored in the lower order 11 bits of the 2-byte data constituting the link string data and information that indicates the header positions of various sets of node information and the like is stored in the upper order 2 bits. The information that indicates the number of words that are present up to the header position of each set of node information or the like is stored in these upper order 2 bits (FIG. 18B).

Thus, since the information that indicates the header position of the immediately preceding set of node information or the like is added to the link string data in this embodiment, even when the link string data are read out in the reverse direction, the entire node information or the like can be read out without omissions.

(6) Altitude information

Figure 19:
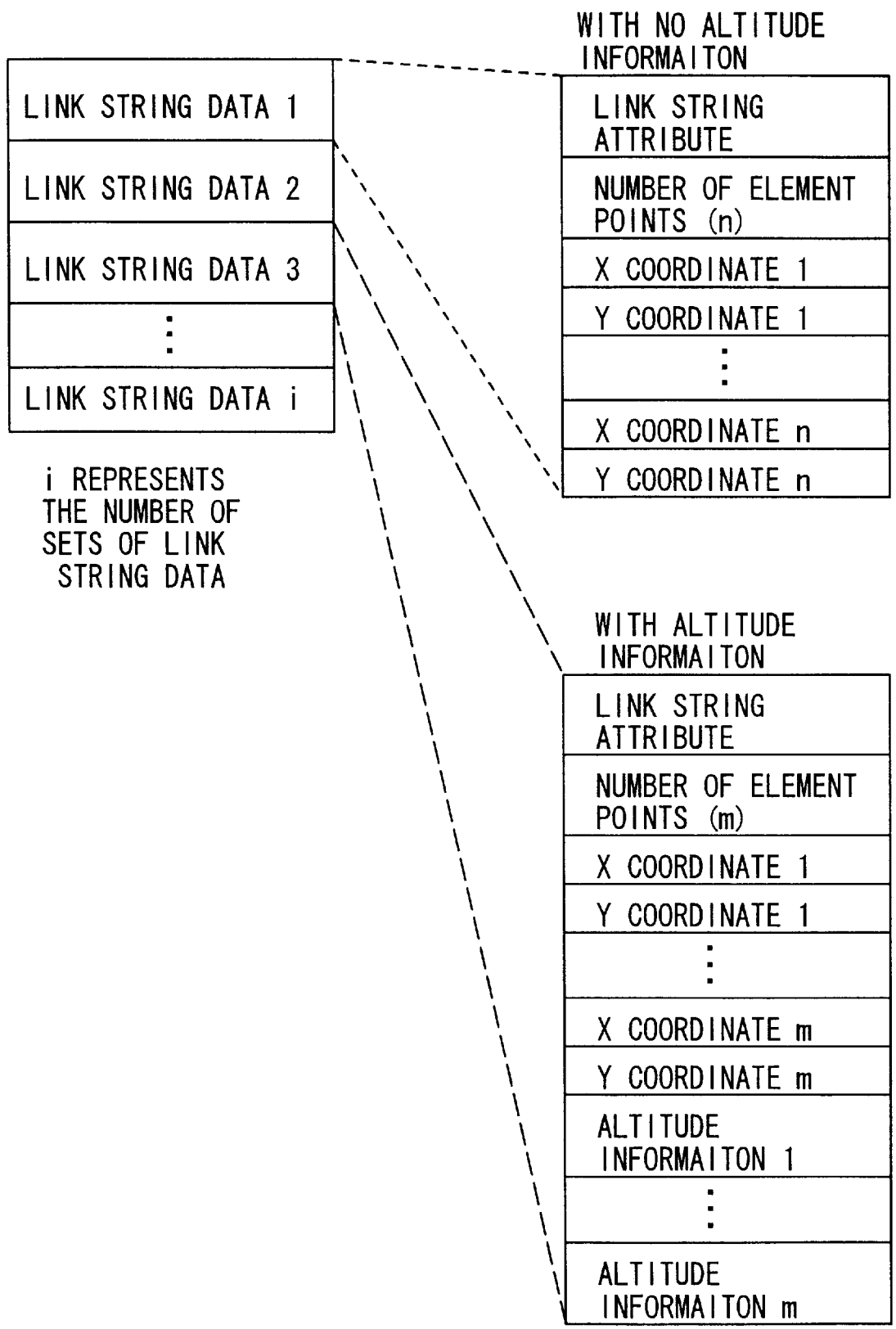
FIG. 19 shows altitude information to be added to the link string data.

When displaying a road map in three dimensions, data concerning the altitude differences among a plurality of points on the road map are required. Accordingly, in this embodiment, all the altitude information on the various links constituting a link string is added at the end of the link string data. Note that FIG. 19 shows an example in which link string data with altitude information and link string data without altitude information are present together.

By adding the altitude information to the link string data in this manner, a road map can be displayed in three dimensions. In addition, since all the altitude information is added together at the end of the link string data, the altitude information can be read out only when it is required and when the altitude information is not required, such as when displaying a regular flat map, for instance, only the data immediately preceding the altitude information need be read out.

(2) Route search data

Figure 20:
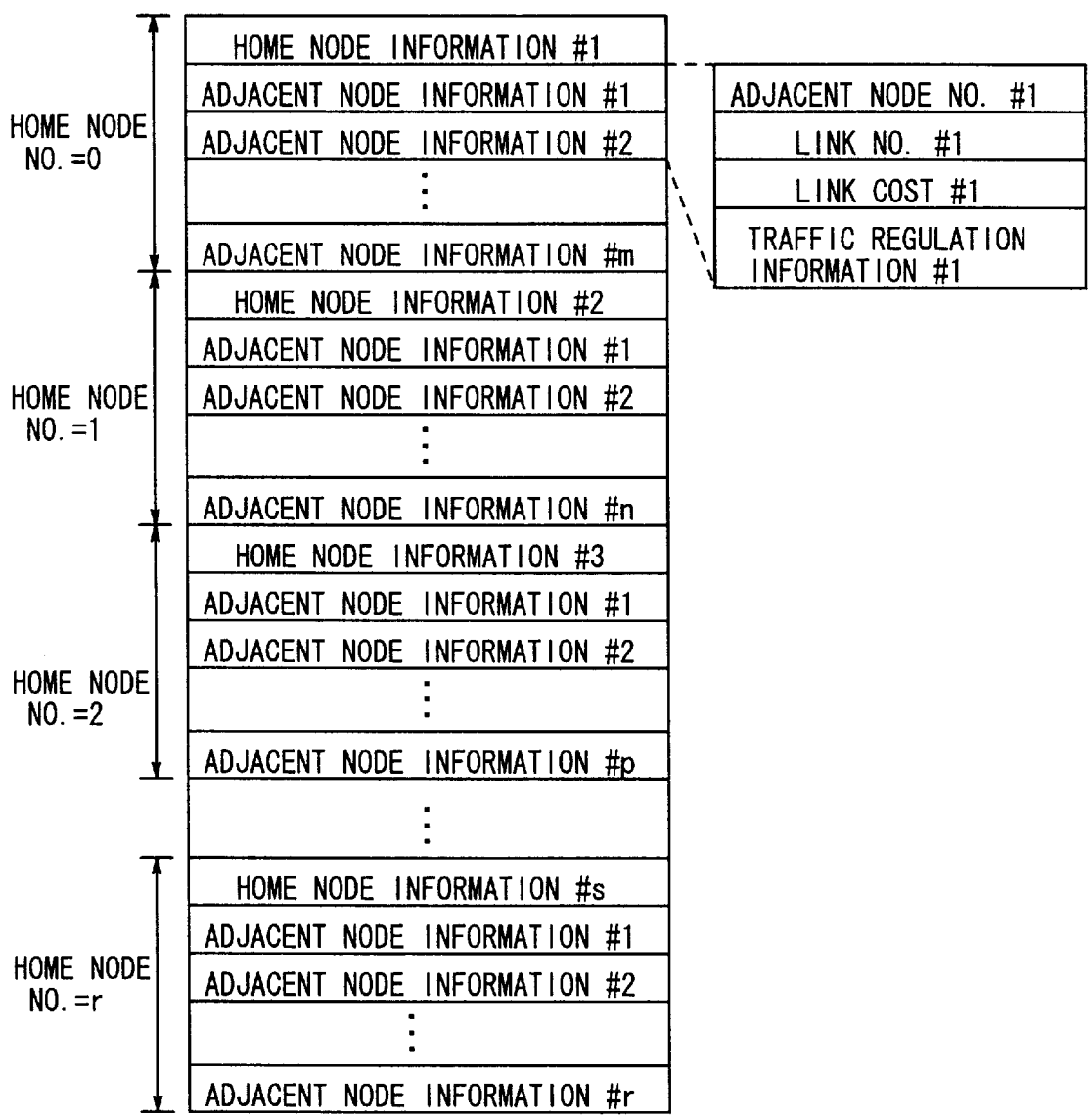
FIG. 20 shows data structure of the route search data.

FIG. 20 shows the data structure of route search data. As shown in the figure, in the route search data, node information which indicates the connecting relationship with other nodes is stored for each connecting point (node) of links, which are the minimum units for expressing a road physical form. Each set of node information is constituted with home node information and adjacent node information, with the node positional coordinates stored in the home node information. In the adjacent node information, as shown in the figure, the adjacent node no., the link no. of the link from the home node to the adjacent node, the link cost of that particular link and traffic regulation information on that link are stored. Also, various sets of node information are stored in an order of connections of links and the node no. of the home nodes can be ascertained by the order in which it is stored. Because of this, even without storing the node no. of the home nodes as home node information, the node no. of the home nodes can be ascertained, achieving a reduction in memory requirement.

Figure 21:
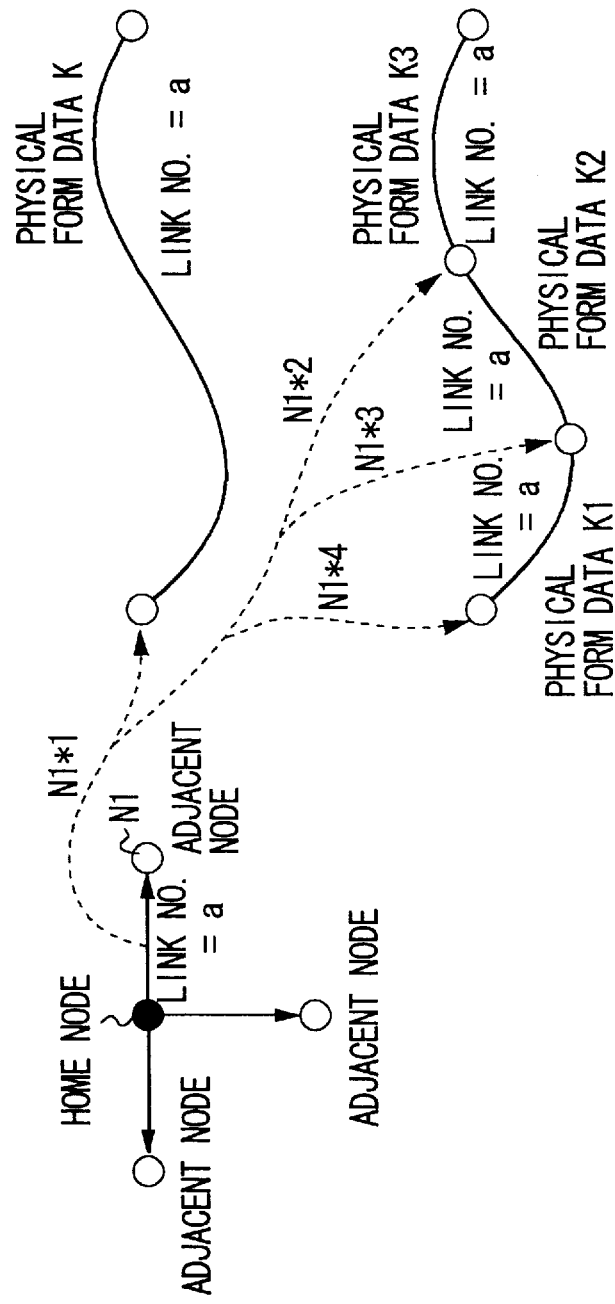
FIG. 21 shows the relationship between the route search data and the route display data in this embodiment.

As shown in FIG. 20, the route search data in this embodiment contain only the connection information of links and do not contain information related to road physical forms. FIG. 21 shows the relationship between the route display data used for displaying a recommended route and the route search data. As shown in FIG. 21, only the minimum information, such as the link no., is stored in a storage area of the route search data for a route which connects between the home node and the adjacent node N1. Road physical form data K corresponding to the link no. are stored in a storage area of the route display data at the same level (the same reduced scale). In addition, in a storage area of the route display data at a lower order level (large reduced scale), road physical form data K1 through K3 corresponding to the link nos. are stored.

Figure 22:
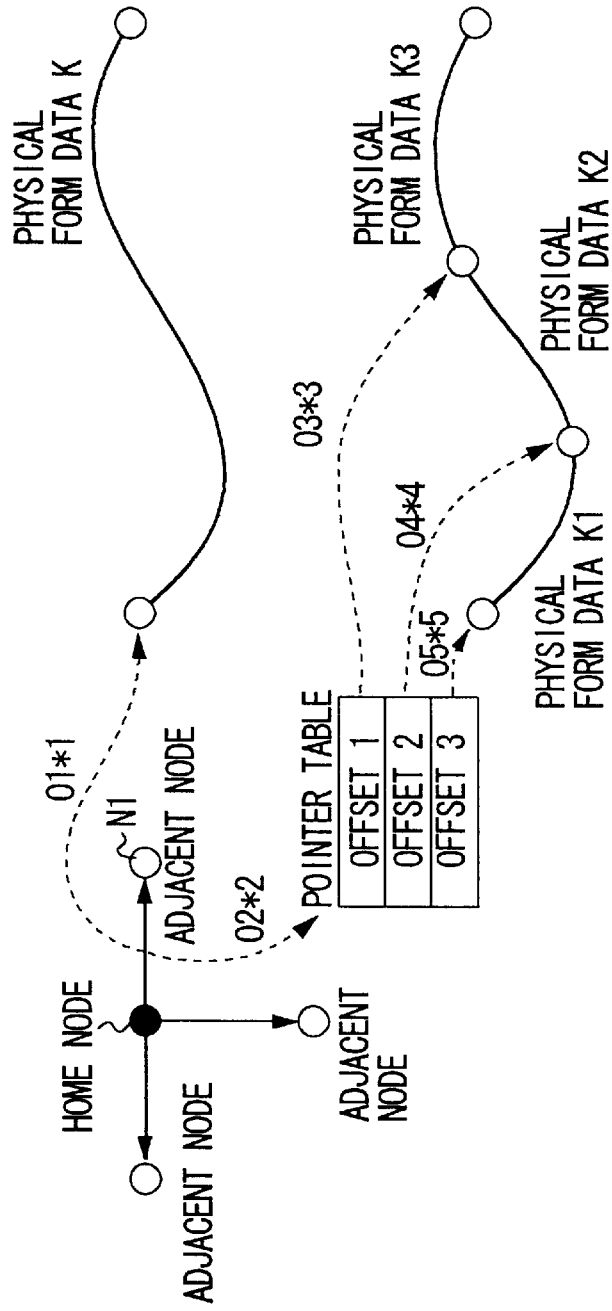
FIG. 22 shows the relationship between the route search data and the route display data in the prior art.
Figure 23:
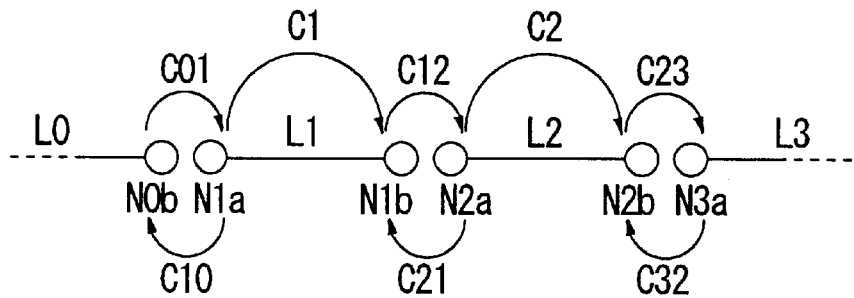
FIG. 23 shows the data management method employed for road map data in an apparatus in the prior art.
Figure 24:
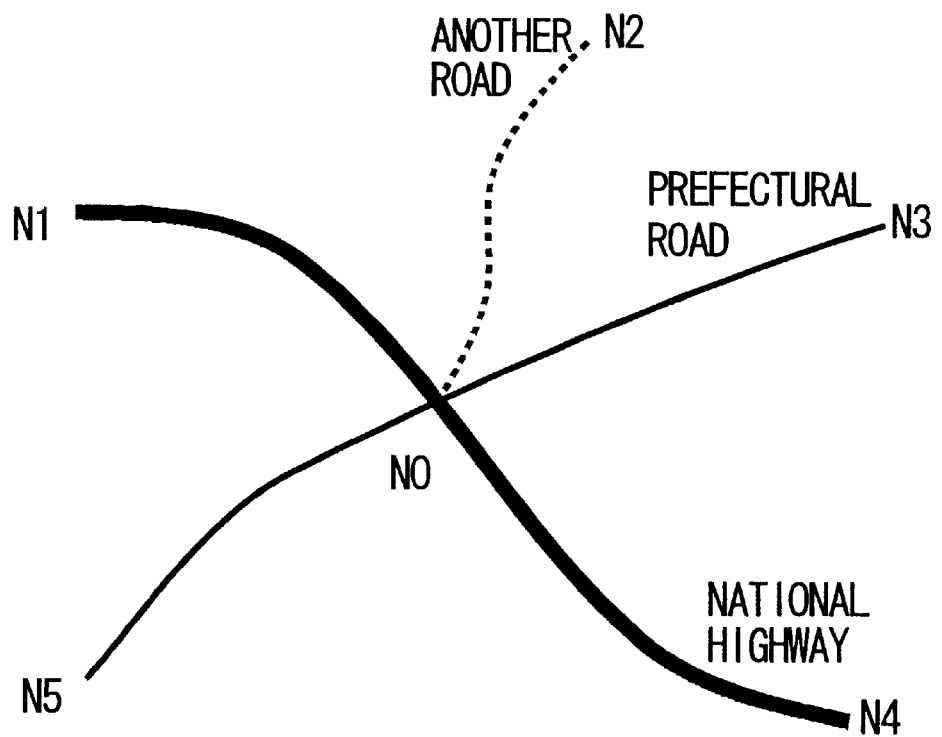
FIG. 24 shows the vicinity of an intersection where a plurality of roads intersect.

In contrast, in route search data in a map database apparatus in the prior art, address offset information for the route display data is held as shown in FIG. 22 instead of the idea of the link no. of the link string data according to the present invention. For instance, for the route connecting between the home node and the adjacent node N1, address offset information 01 for the route display data at the same management level and address offset information 02 for route display data at a lower order level are held. Because of this, a problem arises in that the data volume of the route search data becomes very large.

Since, in this embodiment, road physical forms are detected based upon the link no. in the route search data for the route display data in the manner described above, it is not necessary to include address offset information for the route display data or road data use dispersively for route display in the route search data, and the data volume of the route search data is reduced compared to that of the route search data in the prior art.

What is claimed is:

1. A map database apparatus, comprising a storage device in which link string data is stored, wherein:
    a road on a map represented by a plurality of links and a plurality of nodes is expressed as said link string data, said links representing minimum units of said road, said nodes being at a start point and an end point of each of said plurality of links;
    said link string data has node information relating to said nodes, said node information including identifying information for identifying a link connected to said node and position information related to a position of said node on the map; and
    said node information is shared with adjacent links.

2. A map database apparatus according to claim 1, wherein:
    said node information of said link string data is stored in a memory area of said storage device in an order such that said links are lined up in one direction to form a road on a map.

3. A map database apparatus according to claim 2, wherein:
    said node information includes a storage position of immediately preceding node information so that said link string data can be read out in a direction reverse from said one direction.

4. A map database apparatus according to claim 1, wherein:
    said link string data includes interpolation point position information for interpolating a link physical form by further dividing one of said links into a plurality of portions and position information on individual interpolation points is stored in a memory area of said storage device in a direction in which said links are lined up in one direction to form a road on a map.

5. A map database apparatus according to claim 4, wherein:
    said interpolation point position information includes a storage position of immediately preceding interpolation point information or immediately preceding node information so that said set of link string data can be read out in a direction reverse from said one direction.

6. A map database apparatus according to claim 1, wherein:
    said map is partitioned into a plurality of areas and among roads within one partitioned area, roads of identical type are grouped to constitute one of said link string data.

7. A map database apparatus according to claim 6, wherein:
    said roads of identical type refer to roads assigned with an identical number.

8. A map database apparatus according to claim 6, wherein:
    when two or more of said link string data are stored in memory for said one partitioned area and said link string data each have node information which has identical position information, said node information having said identical position information in said one link string data includes offset data which indicates a storage position of node information having said identical position information in another one of said link string data.

9. A map database apparatus according to claim 8, wherein:
    when node information of said one link string data does not have position information identical to position information of node information of said another link string data, specific information indicating that said node information of said one link string data does not have position information identical to position information in said another link string data is stored in a memory area, in which said offset information is stored, for said node information of said one link string data.

10. A map database apparatus according to claim 1, wherein:
    said node information includes traffic regulation information for links to be connected to a corresponding node.

11. A map database apparatus according to claim 1, wherein:
    said node information includes road width information for links to be connected to a corresponding node.

12. A map database apparatus according to claim 1, wherein:
said node information includes number of lanes information for links to be connected to a corresponding node.

13. A map database apparatus according to claim 1, wherein:
said link string data includes altitude information indicating altitudes in said plurality of links.

14. A map database apparatus according to claim 13, wherein:
said altitude information for all of said plurality of links in one link string data is stored together in memory at an end of said set of link string data.

15. A map database apparatus according to claim 1, wherein:
said link string data are stored in memory for each of various maps at different map scales, said link string data corresponding to each other between said various maps being stored with common identifying information.

16. A map database apparatus, comprising a storage device in which route search data is stored, wherein:
a road on a map represented by a plurality of links and a plurality of nodes is expressed as link string data, said links representing minimum units of said road, said nodes being at a start point and an end point of each of said plurality of links; and
said route search data has home node information of an identical node of one of said link string data, position information of said identical node being identical to position information of a node of another one of said link string data, and adjacent node information of anode which is adjacent to said identical node, said adjacent node including a node of another one of said link string data.

17. A map database apparatus according to claim 16, wherein:
said route search data are stored in a memory area of said storage device in an order in which said plurality of links are lined up in one direction to form a road on a map.

18. A map database apparatus according to claim 16, wherein:
said adjacent node information comprises identifying information for identifying adjacent nodes and information related to links from said identical node to an adjacent node.

19. A map database apparatus according to claim 18, wherein:
said information related to links from said identical node to said adjacent node includes link cost and/or traffic regulation information.

20. A map database apparatus, in which a road on a map represented by a plurality of links and a plurality of nodes is expressed as link string data, said links represent minimum units of said road, and said nodes are at a start point and an end point of each of said plurality of links, comprising:
a first storage device which stores node information constituted with identifying information for identifying said plurality of links and position information for said nodes shared by adjacent links as map display data; and
a second storage device which stores home node information for an identical node of one of said link string data, position information of said identical node being identical to position information of nodes of another one of said link string data, and adjacent node information for representing a node adjacent to said identical node as route search information, said adjacent node including a node of another one of said link string data.

21. A map database apparatus according to claim 20, wherein:
said first storage device and said second storage device store various types of information using identifying information shared by corresponding link string data for each of various maps at different map scales.

* * * * *